(12) United States Patent
Murad et al.

(10) Patent No.: US 9,503,875 B2
(45) Date of Patent: Nov. 22, 2016

(54) SYSTEMS AND METHODS OF DATA COLLECTION, EXCHANGE, AND ANALYSIS

(71) Applicants: Abdullah Murad, Claremont, CA (US); Yousef Abed, Claremont, CA (US)

(72) Inventors: Abdullah Murad, Claremont, CA (US); Yousef Abed, Claremont, CA (US)

( * ) Notice: Subject to any disclaimer, the term of this patent is extended or adjusted under 35 U.S.C. 154(b) by 128 days.

(21) Appl. No.: 14/540,224

(22) Filed: Nov. 13, 2014

(65) Prior Publication Data
US 2016/0142892 A1 May 19, 2016

(51) Int. Cl.
| | |
|---|---|
| *H04W 4/22* | (2009.01) |
| *G06Q 50/26* | (2012.01) |
| *H04W 68/00* | (2009.01) |
| *H04W 76/00* | (2009.01) |
| *H04W 4/14* | (2009.01) |

(52) U.S. Cl.
CPC ............ *H04W 4/22* (2013.01); *G06Q 50/265* (2013.01); *H04W 4/14* (2013.01); *H04W 68/00* (2013.01); *H04W 76/007* (2013.01)

(58) Field of Classification Search
CPC .... G06Q 30/06; G06Q 20/383; G06Q 10/00; G08B 25/009; G08B 29/00; H04L 12/1895; H04L 67/10; H04M 11/04
USPC ................. 705/74; 709/224; 455/404.1, 426; 379/45
See application file for complete search history.

(56) References Cited

U.S. PATENT DOCUMENTS

| | | | | |
|---|---|---|---|---|
| 6,192,381 | B1 * | 2/2001 | Stiegemeier | G06F 17/211 |
| | | | | 715/210 |
| 8,874,071 | B2 * | 10/2014 | Sherman | H04W 4/22 |
| | | | | 455/404.1 |
| 2002/0116247 | A1 * | 8/2002 | Tucker | G06Q 30/06 |
| | | | | 709/224 |
| 2006/0229995 | A1 * | 10/2006 | Ferraro | G06Q 20/383 |
| | | | | 705/74 |
| 2012/0100825 | A1 * | 4/2012 | Sherman | H04W 4/22 |
| | | | | 455/404.2 |
| 2013/0232427 | A1 | 9/2013 | Romero | |
| 2013/0317875 | A1 | 11/2013 | Parker | |
| 2014/0365574 | A1 * | 12/2014 | Franks | H04L 12/1895 |
| | | | | 709/204 |
| 2015/0358794 | A1 * | 12/2015 | Nokhoudian | H04W 4/22 |
| | | | | 455/404.1 |

OTHER PUBLICATIONS

Visionations, LLC., "On-scene Case Management" http://www.visionations.com/features.html, 2013.
Droidspirit, "Crime Scene Tracker" https://play.google.com/store/apps/details?id=edu.mtsu.fire.android&hl=en, Jan. 15, 2014.

* cited by examiner

*Primary Examiner* — William Nealon
(74) *Attorney, Agent, or Firm* — Oblon, McClelland, Maier & Neustadt, L.L.P.

(57) ABSTRACT

An information processing system is described, which has circuitry configured to receive, via a mobile application, a data entry form request for a type of incident. The circuitry is also configured to select, via a server of the information processing system, at least one data entry form based on the request. The at least one data entry form is customized according to an established protocol for the type of incident. The circuitry is also configured to receive data entered into a selected data entry form, and analyze and process the received entered data based on the established protocol for the type of incident. The circuitry is also configured to forward the received entered data to one or more designated entities.

20 Claims, 8 Drawing Sheets

Car #1

Car Identification

Year      Make      Model

Initial damage assessment

☐ Total      ☐ Major      ☐ Minor

Description:

340

Driver Identification

Name      Driver's Lic. No.

Address      Phone No.

Insurance Co.

Registration No.

Passenger Identification

Name

Address

Phone No.

Fig. 3C

Car #2

Car Identification

Year      Make      Model

Initial damage assessment

☐ Total      ☐ Major      ☐ Minor

Description:

Driver Identification

Name      Driver's Lic. No.

Address      Phone No.

Insurance Co.

Registration No.

Passenger Identification

Name

Address

Phone No.

SYSTEMS AND METHODS OF DATA COLLECTION, EXCHANGE, AND ANALYSIS

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many agencies or organizations are structured to include a central office of workers and information, along with one or more field groups who glean information from a periphery about the agency or organization. Field personnel collect findings and information, which is transferred or communicated back to the main office where decisions are made. One example of a central-office/field-office structure is a law enforcement agency. Field personnel may be dispatched to a scene of a crime to collect information about the crime, including location, pictures, property damage, and other related information. This information is usually collected and brought back to the office for data entry into a main computer system for storage and analysis.

Data communication processes between central and field personnel tend to be verbal and are completed using a variety of tools, such as telephones, two-way radios, paper forms, cameras, digital voice recorders, geospatial-positioning systems (GPS), and other specialized equipment. These devices are typically not integrated or interconnected. Since the information is not aggregated, it is not used for immediate strategic and tactical decisions. Since the field personnel are physically distanced from the central office personnel, there is a lag from the time the information and evidence is collected to the time the information and evidence is available to central office decision makers.

SUMMARY

In one embodiment, an information processing system is described, which has circuitry configured to receive via a mobile application, a data entry form request for a type of incident from a user. The circuitry is also configured to select at least one data entry form based on the request via a server of the information processing system. The at least one data entry form is customized according to an established protocol for the type of incident. The circuitry is also configured to receive entered data into a selected data entry form from the user, and analyze and process the received entered data based on the established protocol for the type of incident. The circuitry is also configured to forward the received entered data to one or more designated entities.

In another embodiment, a graphical user interface (GUI) is described, which has circuitry configured to present a data entry form via a mobile application that is specific to an indicated incident to a user in response to the indicated incident. The circuitry is also configured to analyze entered data from the data entry form via one or more servers, and forward the analyzed entered data to a designated receiver via a web application according to an established protocol of an agency responsible for handling the indicated incident. The circuitry is also configured to repeat the presenting, analyzing, and forwarding steps in parallel for additional data requested from the user, based upon previously entered data.

In another embodiment, a method is described. The method includes receiving a reported incident from a user via a mobile application, and presenting via a GUI a data entry form specific to the reported incident to the user. The method also includes analyzing entered data of the data entry form from the user via one of a server infrastructure or a cloud computing system. The server infrastructure and the cloud computing system both have software-configured circuitry. The method also includes forwarding the analyzed entered data via a web application to one or more designated receivers according to an established protocol of an agency responsible for handling the indicated incident. The method also includes parallel processing the receiving, the presenting, the analyzing, and the forwarding of subsequent data requested and received from the user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Systems and methods of data collection, exchange, and analysis are described by embodiments herein. Field personnel can collect on-scene information, such as locations, incidents, suspects, and other critical information, and immediately communicate their findings to their central office using embodiments described herein. Mobile devices and technologies can be used by a central-office/field-office structure to provide multi-media, location-based instant notification technologies.

One embodiment includes generating a user interface based on an input corresponding to a selected crime or incident type. The user interface includes data entry forms corresponding to the selected crime or incident. The data entry forms are assigned a unique identifier, such as a serial number that corresponds to a law enforcement data tracking system.

Another embodiment includes generating a user interface based on an input corresponding to a crime or incident type. The crime or incident type is determined based on an input from a law enforcement dispatch service. The input includes a geospatial position of the crime or incident. In another embodiment, the user interface generation includes data entry forms corresponding to the selected crime or incident, and fields of the data entry forms are populated with data corresponding to the crime or incident, such as the crime location and names of individuals involved in the crime or in the incident. The data for populating the data entry forms is received from the law enforcement dispatch service.

Another embodiment includes evidence collection and investigative protocol instructions corresponding to the selected crime or incident. The interface may also be configured to link audio and/or image data with the data entry forms.

Figure 1:
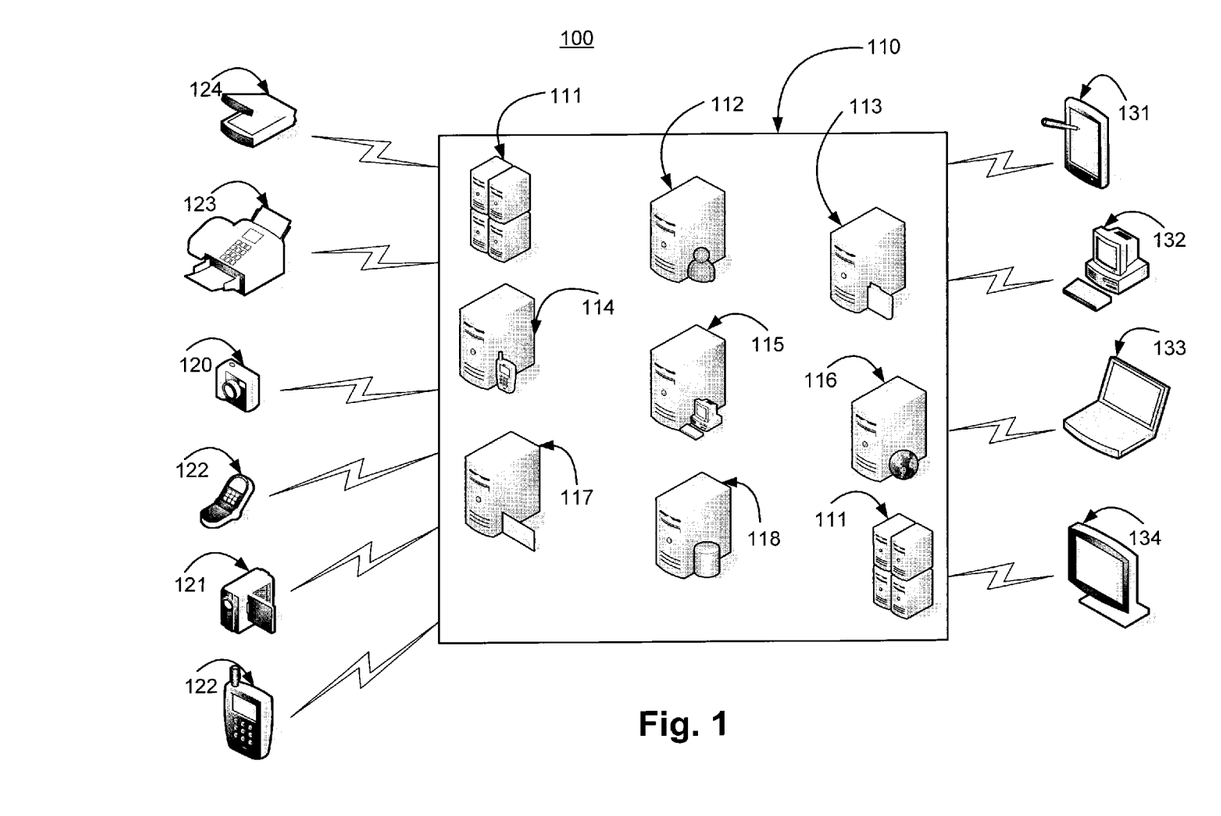
FIG. 1 is a block diagram of an information processing system, according to one embodiment.

The embodiments summarized above can be incorporated by a server infrastructure, which communicates with a plurality of communication devices via a mobile application and communicates with a plurality of computing devices via a web application. Referring now to the drawings, wherein like reference numerals designate identical or corresponding parts throughout the several views, FIG. 1 is a block diagram of an information processing system 100, which includes one or more servers 110. The servers 110 include circuitry that is configured in part, by software to execute the embodiments described herein. In FIG. 1, the servers 110 include an application server 111, a real-time communication server 112, a file server 113, a mobile information server 114, a management server 115, a web server 116, an email server 117, and a database server 118. FIG. 1 illustrates the servers 110 as individual single servers. However, one or more embodiments described herein may contain other configurations, such as multiple servers of one type, an absence of one or more of the illustrated servers, or the addition of other servers not illustrated. In addition, some of the servers 110 may be combined into a single operating structure, and some of the servers 110 may be physically located in a remote location with respect to the remaining servers 110.

The information processing system 100 also illustrates several communication devices in which to communicate with the servers 110. The communication devices include a camera 120, a video recorder 121, one or more wireless phones 122, a fax 123, and a scanner 124. FIG. 1 illustrates the communication devices as being wireless. However, some of the communication devices, such as the fax 123 and the scanner 124 can also communicate with the servers 110 through wired connections. In addition, not all of the illustrated communication devices need to be part of the information processing system 100, and there may be other communication devices present that are not illustrated in FIG. 1.

The information processing system 100 also illustrates several computing devices that are in communication with the servers 110. The computing devices include a tablet computer 131, a personal computer 132, a laptop computer 133, and a monitor computer 134. However, other computing devices may be included in the information processing system 100, and not all of the computing devices illustrated in FIG. 1 need to be part of the information processing system 100. The computing devices can be wire-connected or wirelessly connected to the servers 110. An alternative embodiment to the servers 110 illustrated in FIG. 1 includes a cloud computing system that is configured with circuitry and programmed by software to communicate with the communication devices 121-124 and the computing devices 131-134.

Embodiments described herein incorporate an information processing system, such as the information processing system 100 in order to collect data at an incident site and provide results back to the incident site at or near real time. A GUI is generated for input corresponding to the incident. A unique identifier, such as a serial number or case number can be input, if the user is responding to a reported incident, such as a law enforcement officer. A selected form can be auto-populated with information associated with the unique identifier. Geospatial positioning can also be used, along with input from the user.

Figure 2A:
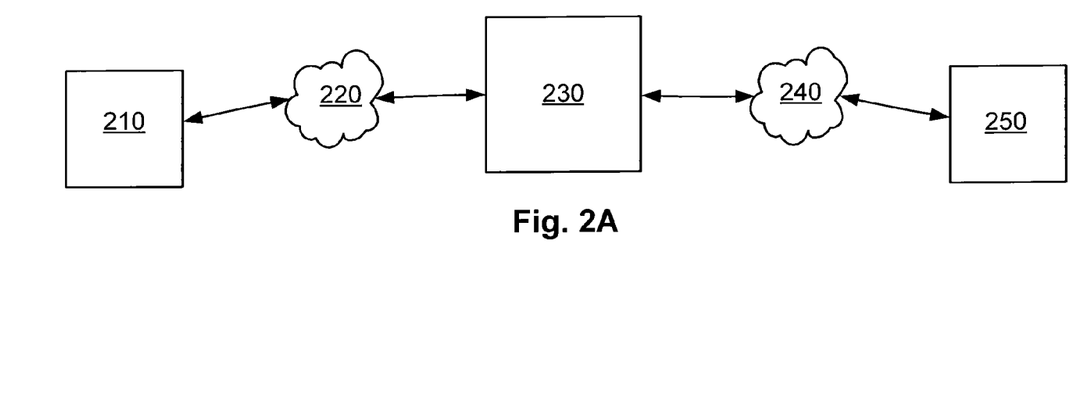
FIGS. 2A-2B are illustrations of data collection, exchange, and analysis at a location of an incident, according to one embodiment.
Figure 2B:
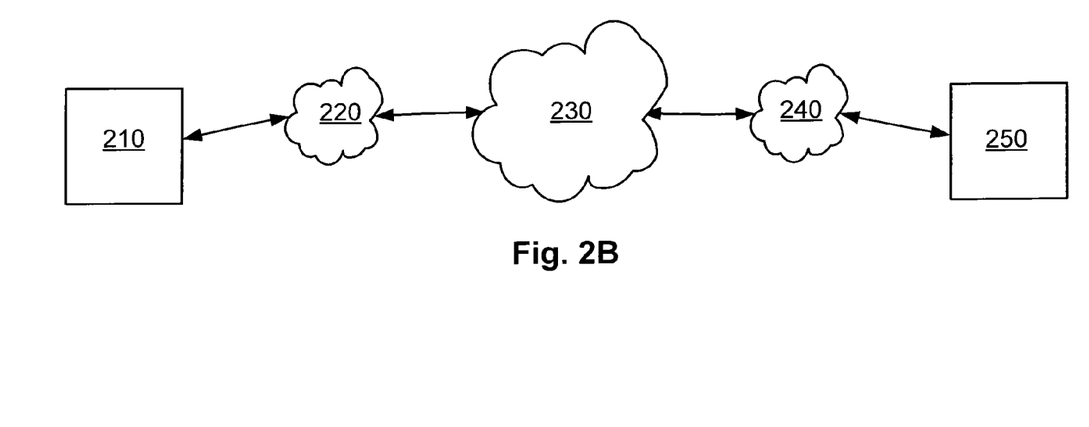

FIG. 2A illustrates an embodiment of data collection, exchange, and analysis at a location of an incident. The type of incident can include, but is not limited to a traffic incident, a crime incident, a natural disaster incident, a news-reporting incident, an emergency aid incident, an emergency rescue incident, a military operation incident, or a supply-and-demand incident. FIG. 2B illustrates a similar configuration as FIG. 2A, but illustrates a cloud 230 configured with circuitry and programmed by software to execute similar functions as the server matrix 230 of FIG. 2A. Other reference numbers in FIG. 2B refer to like reference numbers in FIG. 2A. For illustrative purposes only, FIG. 2A will be described in terms of a traffic incident.

In an embodiment for a vehicle crash, a responding law enforcement officer could use a mobile device 210 to select a mobile application 220, which provides an interactive display screen with an option to select a type of incident from a plurality of incidents. In this embodiment, a vehicle crash incident would be selected. A server matrix 230 would provide a data entry form that is pertinent to a vehicle crash, via the mobile application 220 to the mobile device 210. The law enforcement officer would be prompted to enter data relating to a vehicle crash, such as the number of cars involved, the driver(s) names and identifications, the location of the vehicle crash, and an initial assessment, such as injuries or other related events. Each entry by the law enforcement officer will determine the next prompt for data entry. For example, if the initial entry for the number of cars was one, then the mobile application 220 would proceed to a non-car data request after data for the one car was collected. However, if the initial entry for the number of cars was two or three, the mobile application 220 would request information on the second and third cars, respectively upon receiving complete information for the first car.

The order of requested information could be programmed according to certain agency protocols. For an example of a law enforcement agency, after the data for a vehicle crash incident is received, a first series of questions may pertain to possible injuries and/or dangerous situations. If the mobile application 220 receives data entry for one or more injuries, the server matrix 230 could immediately respond by requesting, via a web application 240, to summon an ambulance, via one or more computing devices 250. While the above-described injury exchange is being analyzed and processed, the law enforcement officer may begin entering data for a dangerous situation, such as a leaking fuel tank or a downed power line. As a result, a fire crew or a hazardous material crew may be immediately summoned to the situation, via the server matrix 230 and web application 240 to one or more computing devices 250 of the fire crew or the hazardous material crew. Therefore, the injury data exchange could be processed and analyzed in parallel with the dangerous situation data exchange. As a result, appropriate entities could be summoned as quickly as the data could be entered, and multiple entries for multiple scenarios could be processed in parallel.

Figure 3A:
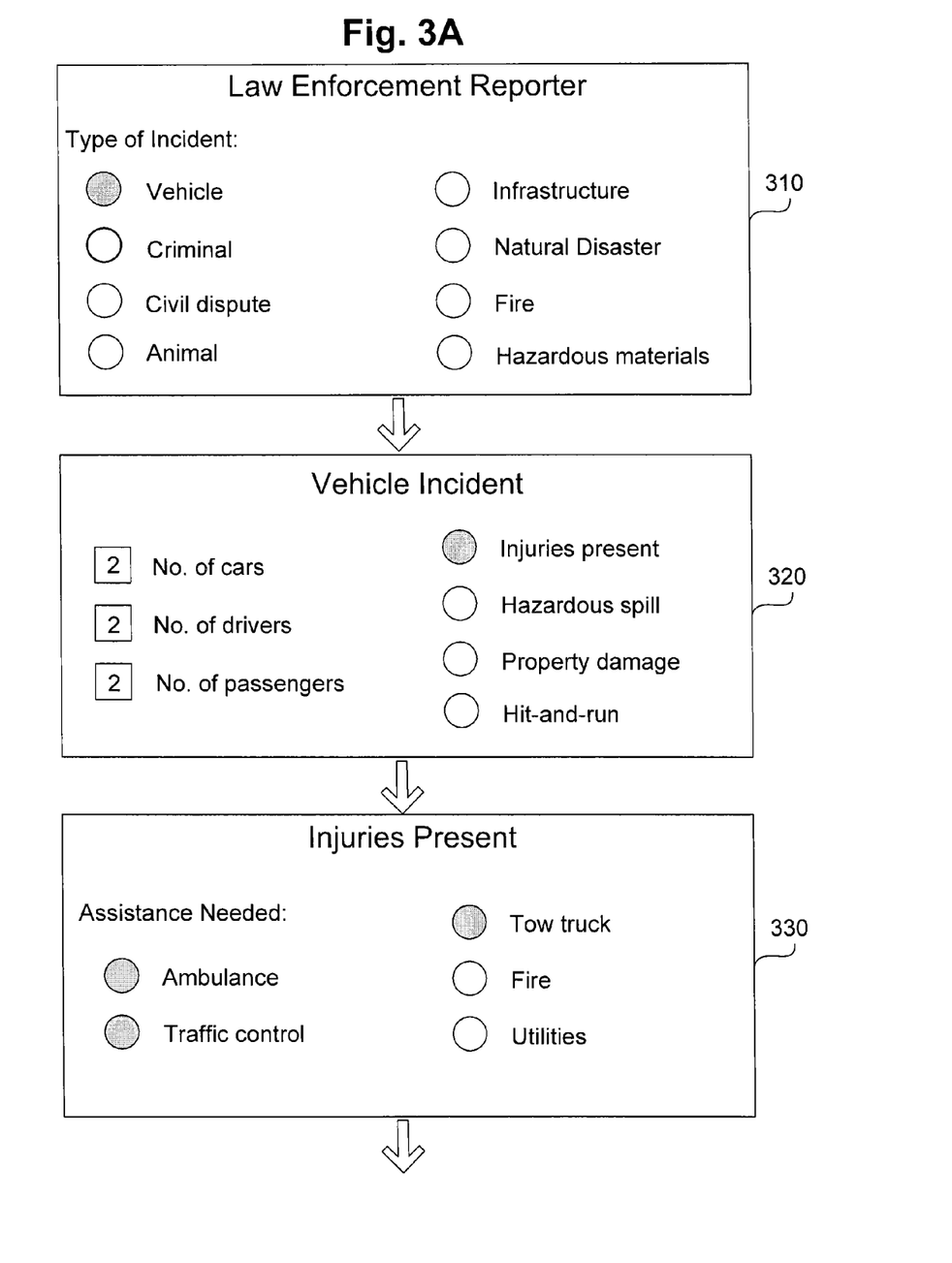
FIGS. 3A-3C are snapshot illustrations for the collection, exchange, and analysis of data, according to one embodiment.
Figure 3B:
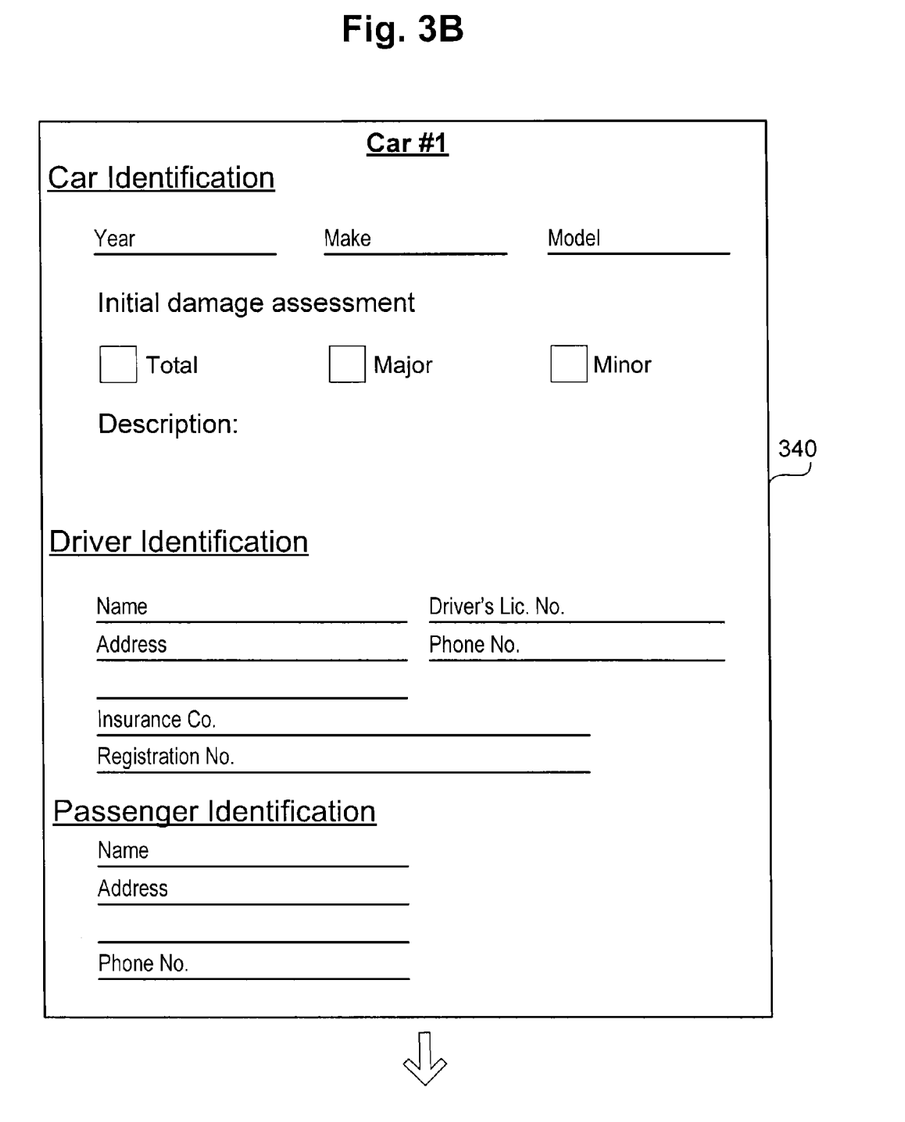
Figure 3C:
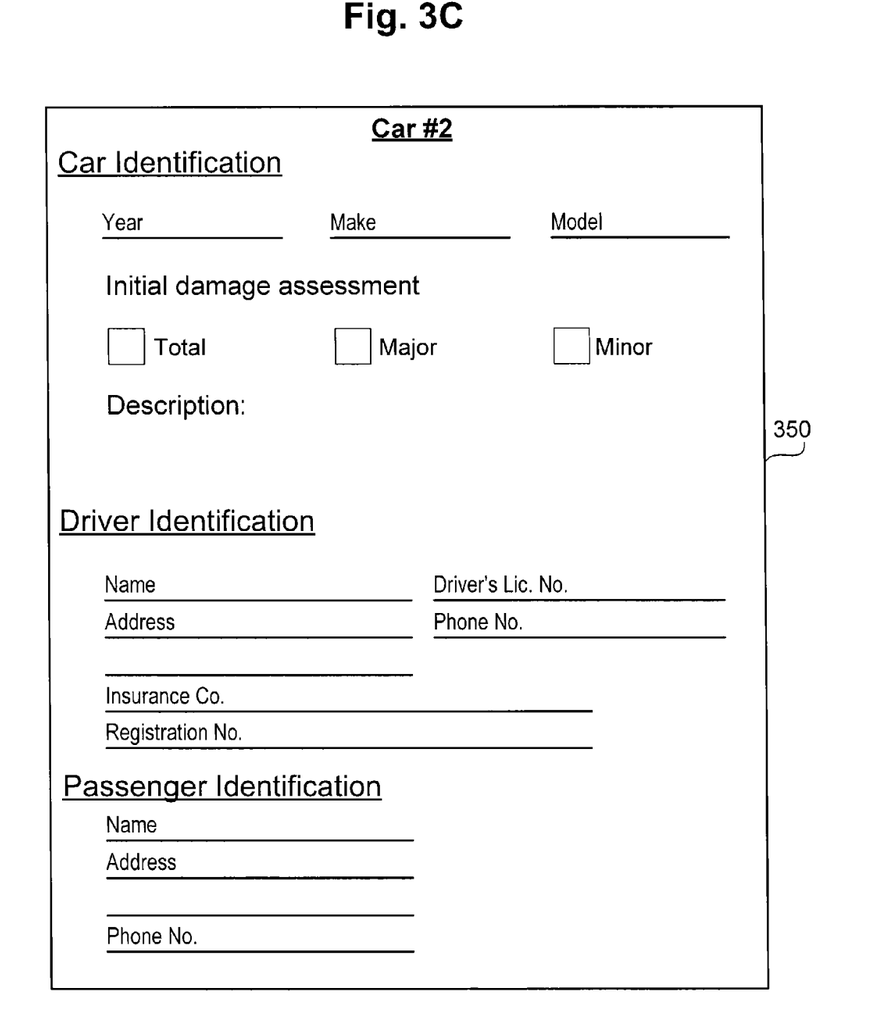

FIGS. 3A-3C illustrate multiple snapshot views of a graphical user interface (GUI) for the user (i.e. law enforcement officer in the above-described example) to input data for subsequent analysis and response. For the sake of simplicity, not all of the details described above are illustrated in FIGS. 3A-3C. In FIG. 3A, a first snapshot 310 illustrates a data entry request to identify the type of incident. Options for a vehicle, criminal, civil dispute, animal, infrastructure, natural disaster, fire, and hazardous materials incidents are illustrated. However, several other types of incidents related to law enforcement could be presented, and are contemplated by embodiments described herein. In the above-described example, a vehicle incident is reported in the snapshot 310.

In response to a vehicle incident selection, the server matrix 110 provides a data entry request for general information concerning the vehicle incident, illustrated in a snapshot 320, such as the number of cars, the number of drivers, and the number of passengers. Snapshot 320 also presents a request for data concerning other issues related to a vehicle incident, such as an inquiry for injuries present, any hazardous spillage, any property damage, and whether a hit-and-run issue is present. However, several other issues related to a vehicle incident could be presented, and are contemplated by embodiments described herein. Snapshot 320 illustrates that "injuries present" has been selected.

In response to injuries being present, the server matrix 110 provides a snapshot 330 to request entry of injury-related services that might be needed, such as an ambulance, traffic control personnel, a tow truck, fire department personnel, and utility company personnel and services. However, several other types of services or equipment can be presented in relation to injuries being present at a vehicle incident. In addition, each selection in snapshot 330 may prompt the user for additional information. For example, in a tow truck selection, the user may be prompted for the number of tow trucks needed, since this was previously illustrated as having two cars involved. Also, if the "utilities" option had been selected, the user may be further prompted for the type of utility company, such as electric, gas, water, etc.

After more critical data has been obtained, the server matrix 110 presents a snapshot 340 to the user to obtain data for the first car, illustrated in FIG. 3B. Snapshot 340 requests data pertaining to the first car, such as the year, make, and model of the vehicle. A general assessment is requested concerning the damage, such as total vehicle damage, major vehicle damage, or minor vehicle damage. A brief description of the damage is also requested. Additional information may also be requested in response to certain previous input. For example, multiple questions may be asked if a total vehicle damage was input.

Snapshot 340 also requests general information concerning the driver of the first car, such as the name, address, and phone number of the driver, as well as his/her driver's license number, the driver's insurance company, and the vehicle registration number. Passenger information for the first car is also requested, such as name, address, and phone number. Snapshot 350 in FIG. 3C illustrates data requests for the same information for the second vehicle as for the first vehicle illustrated in FIG. 3B.

Snapshots 310-350 illustrate that data was requested for injury-specific issues prior to requesting data for the vehicles, drivers, and passengers. The previous illustration of obtaining injury-related data first is one example of how a vehicle protocol could be established. In another embodiment, a new snapshot window could be presented for each individual issue selected in snapshot 320. For example, a new snapshot could be presented as soon as a first issue, such as "injuries present" was selected, then a second snapshot could be presented if a second issue, such as "hazardous spill" was selected. Alternately, the server matrix 110 could wait to see if a subsequent issue was selected and present a single new snapshot dealing with both issues of "injuries present" and "hazardous spill" together.

Another embodiment includes more than one law enforcement officer collecting and forwarding entered data, which could be parallel processed along with the first officer's entered data. Still another embodiment includes consideration of any data obtained by non-law enforcement individuals, such as witnesses. Evidence of photographs from a camera, such as the camera 120 or video footage from a video recorder, such as the video recorder 121 could be forwarded through the mobile application 220 to the server matrix 230 for processing, wherein the GUI is configured to link audio and/or image data with the data entry forms. Other evidence, such as a drawing of a hit-and-run vehicle or a hit-and-run driver could be faxed via the fax 123 or scanned and emailed via the scanner 124 to the server matrix 230 through the mobile application 220. In response, the server matrix 230 could forward evidence of the hit-and-run to an investigative official, through the web application 240 to a personal computer device 250 for instance, which would result in immediate attention to the investigative aspect of the vehicle crash. The GUI could include protocol instructions for evidence collection and investigation that corresponds to the selected incident.

Another embodiment is now described with regard to a natural disaster incident. A public or private official may have been summoned to an earthquake-hit location. Upon arriving, the official could request a data entry form for an earthquake incident from a plurality of available incidents displayed on a communication device to a server matrix through a mobile application. The order of requested information could be programmed according to certain protocols. For example, a first level of data could be a series of data prompts regarding injuries. A second level of requested data could pertain to possible dangerous situations, such as leaking fuel lines, downed power lines, and open sewer lines. A third level of requested data could pertain to accessible roads in and out of the incident region. A fourth level of requested data could pertain to accounting for people believed to be in the affected region. An embodiment further allows the user to select which area within the overall incident area to complete first. For example, there may not be any injuries in the earthquake incident, but there may be several downed trees which have stranded several hundred motorists. Therefore, a first level of data entry may be for traffic and road assistance.

Immediate assistance could be summoned by entry of data into the earthquake incident data entry form, similar to the embodiment described above for a vehicle crash. While one aspect of assistance is being executed, such as summoning one or more ambulance vehicles to the area, another issue or level of data could be entered. In addition, the levels of requested data may become overlapped. For example, if there are several injuries and several blocked roads, parallel processing of communication inquiries for available hospitals and open roadways along with injury inquiries or requests could occur simultaneously, as well as responding to dangerous environmental issues. In addition, multiple agencies would likely be involved in the above-described situation. With reference to FIG. 1, the multiple communication devices 121-124 can immediately communicate data in the form of one or more completed data entry forms, photographs, video clips, scanned images, and faxed images. In addition, the various communications from the initial agency, group, or individual can quickly be integrated with other agencies, groups, or individuals. For example, the earthquake incident described above could involve medical responders, fire and rescue responders, law enforcement agencies, utility agencies, relief agencies, news agencies, etc. The server matrix 110 provides parallel processing for several different avenues of data and corresponding responders, as well as keeping the several different avenues of responders interconnected.

Another embodiment is directed to a news-reporting incident. A news reporter may have been called to the scene of a house fire, as an example. It may have been initially reported that the fire was under control and a fire crew was on hand putting the blaze out. Therefore, just one reporter and one camera crew went to the scene to report the incident. Upon arriving, the reporter could request a data entry form to begin entering data about the fire incident.

Figure 4:
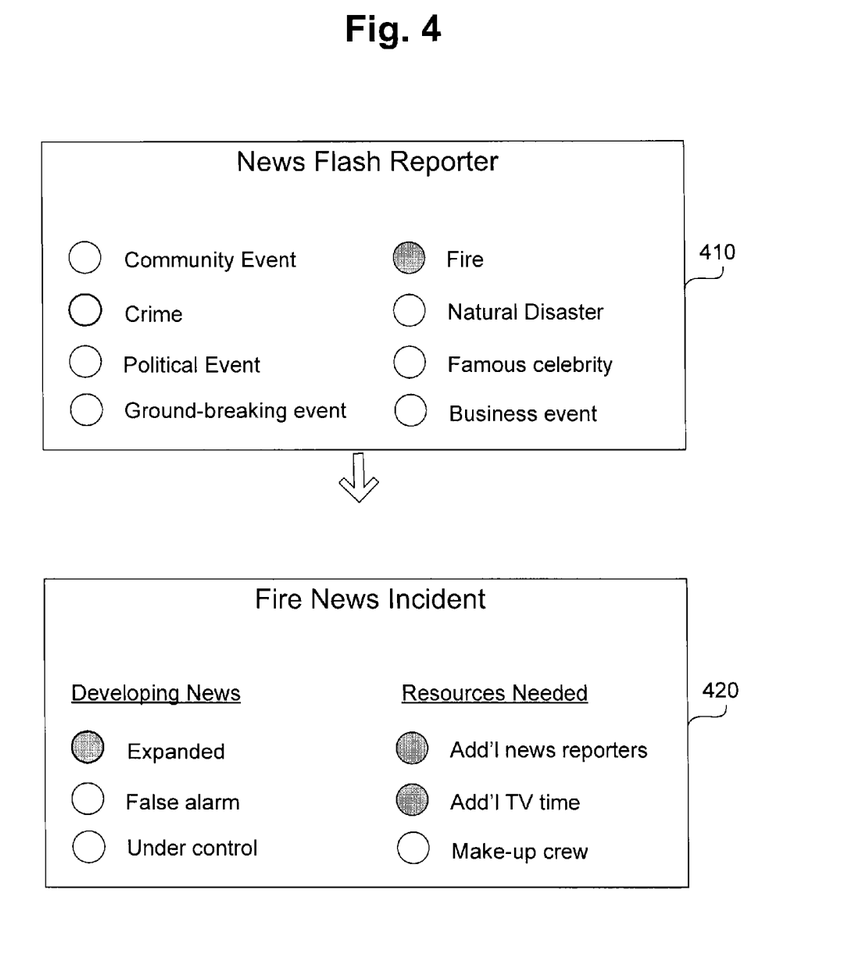
FIG. 4 illustrates snapshots for the collection, exchange, and analysis of data, according to one embodiment.

FIG. 4 illustrates an initial snapshot 410 that could be used in the news-reporting industry, which includes general topics pertaining to the news field. FIG. 4 is an abbreviated list, for the sake of simplicity, and includes fire, natural disaster, crime, political event, community event, famous celebrity, business event, and ground-breaking event. However, any other field that would fall under the auspices of a news-reporting field could be included. In addition, certain news-reporting fields could display sub-categories when selected. For example, a natural disaster incident could include sub-categories of flood, tornado, hurricane, drought, earthquake, etc. when selected.

In the example previously described, one news reporter and one camera crew responded to the initial report of a house fire. In the event that additional information or interests are discovered, the user, i.e. first reporter could immediately report the additional information or interests to elicit any additional resources needed. For example, the fire was thought to be under control, but is no longer contained. As a result, the fire may spread to one or more additional homes. The fire crew has now expanded to include additional personnel, and rescue personnel may be evacuating a larger area. This developing news story could be immediately input using embodiments described herein, such that additional news-reporting personnel and a larger block of new-reporting time can be initiated. FIG. 4 illustrates a follow-up snapshot 420 to include needed resources to cover the developing story. As an example for illustrative purposes only, the subsequent snapshot could include additional reporters to interview witnesses living near the area, and to include interviews with agencies directly involved with the fire incident, such as the local fire department, the local police department, local utility companies, the local hospital, etc.

Figure 5:
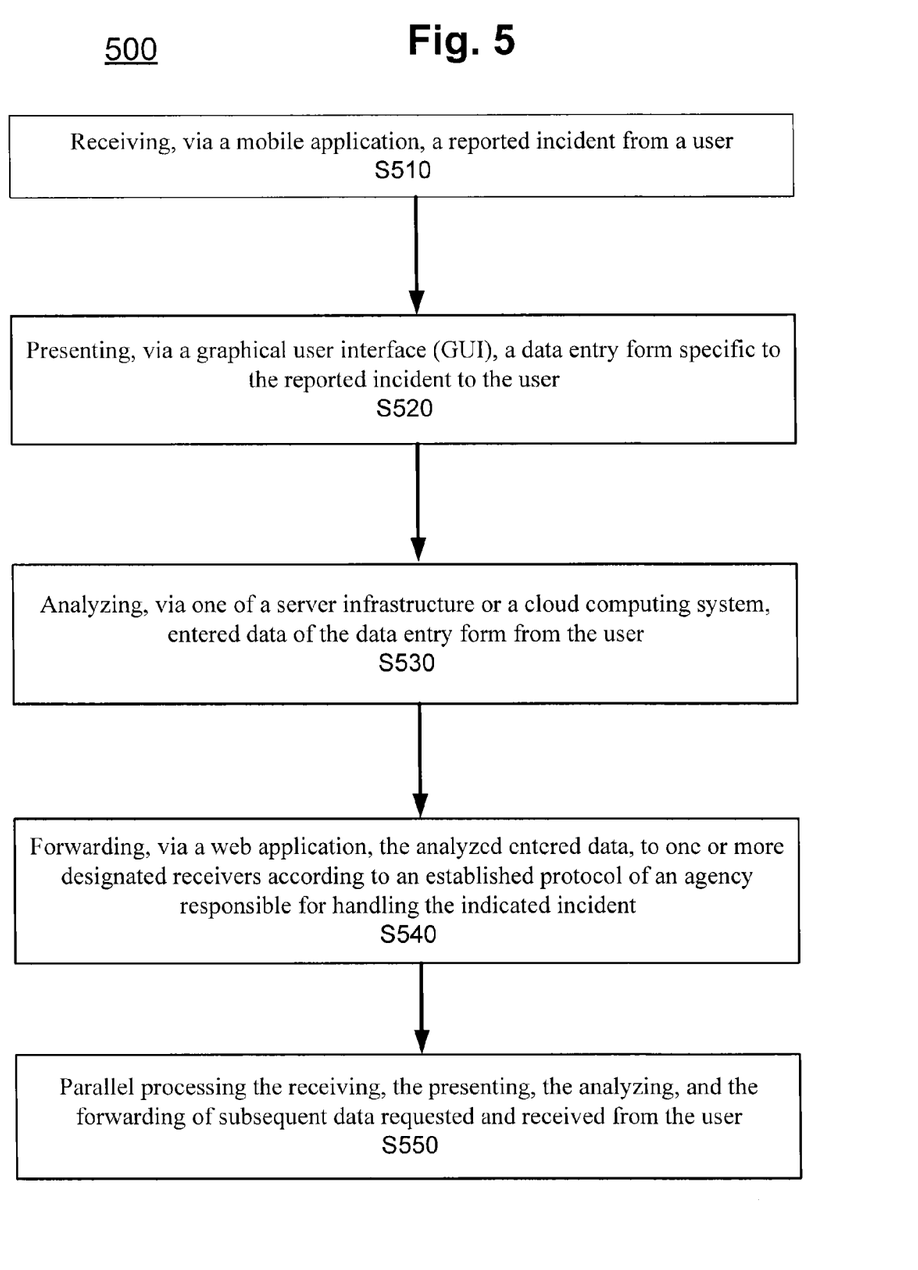
FIG. 5 is a flowchart for a method, according to one embodiment.

FIG. 5 is a flowchart illustrating a method 500, according to embodiments described herein. A reported incident is received, via a mobile application, from a user in step S510. The reported incident could include one of a traffic incident, a crime incident, a natural disaster incident, a news-reporting incident, an emergency aid incident, an emergency rescue incident, a military operation incident, or a supply-and-demand incident. A data entry form specific to the reported incident is presented, via a GUI, to the user in step S520. In one embodiment, the GUI is presented based upon a geographical location of the user. The entered data of the data entry form from the user is analyzed, via one of a server infrastructure or a cloud computing system, in step S530. The analyzed entered data is forwarded, via a web application, to one or more designated receivers according to an established protocol of an agency responsible for handling the indicated incident in step 5540. The receiving, the presenting, the analyzing, and the forwarding of subsequent data requested and received from the user is parallel processed in step S550. Other embodiments include initiating an action from another entity, based upon the analyzed entered data. Examples of another entity include, but are not limited to an ambulance, a fire and rescue crew, a toxic spill crew, a tow truck, a traffic control crew, a utility company, and a road and highway crew. Another embodiment could include notifying one or more interested entities of available results for the analyzed entered data by one or more of an email, a phone call, a text message, or a mobile push notification.

Figure 6:
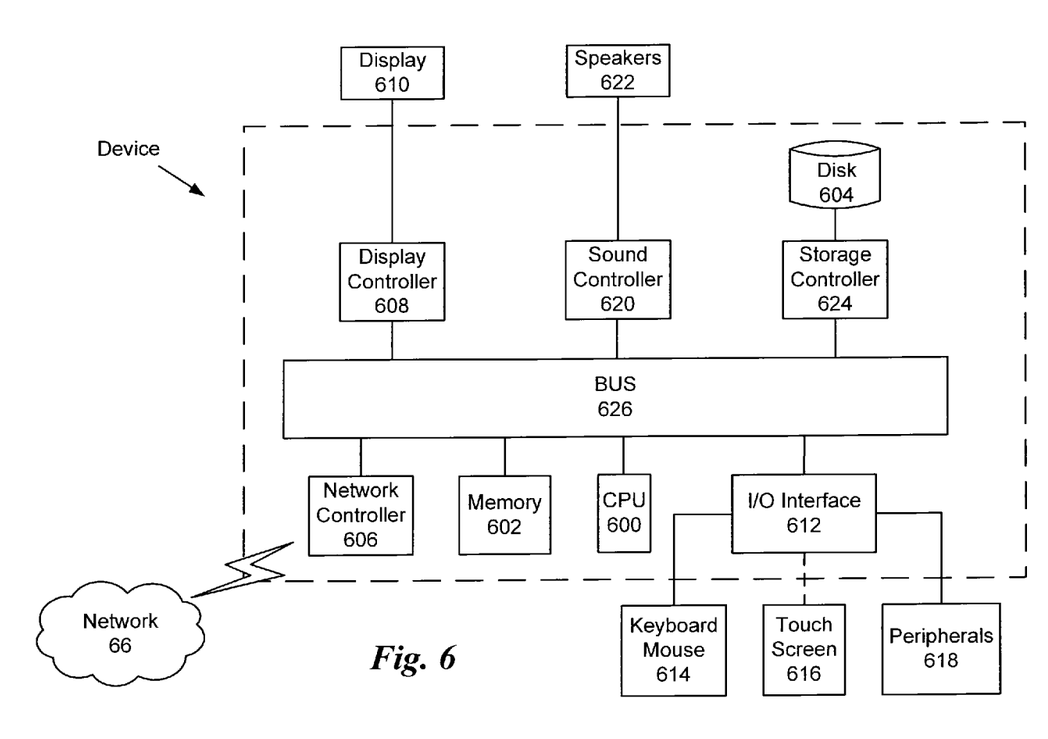
FIG. 6 is a block diagram of a computing system, according to one embodiment.

The systems and methods described herein can be executed via an information processing system, such as the system described with reference to FIG. 1. FIG. 6 gives a more detailed illustration of any one of the communication devices 121-124, the servers 111-118, or the computing devices 131-134. Some of the communication devices 121-124, the servers 111-118, and the computing devices 131-134 can have additional features not mentioned hereinafter, and can also be absent certain features described with reference to FIG. 6.

In FIG. 6, the communication, server, or computing device includes a CPU 600 which performs the processes described above. The process data and instructions may be stored in memory 602. These processes and instructions may also be stored on a storage medium disk 604 such as a hard drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the communication, server, or computing device communicates.

Further, the claimed embodiments may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The communication, server, or computing device in FIG. 6 also includes a network controller 606, such as an Intel Ethernet PRO network interface card from Intel Corporation of America, for interfacing with network 66. As can be appreciated, the network 66 can be a public network, such as the Internet, or a private network such as an LAN or WAN network, or any combination thereof and can also include PSTN or ISDN sub-networks. The network 66 can also be wired, such as an Ethernet network, or can be wireless such as a cellular network including EDGE, 3G and 4G wireless cellular systems. The wireless network can also be WiFi, Bluetooth, or any other wireless form of communication that is known.

The communication, server, or computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface 612 also connects to a variety of peripherals 618 including printers and scanners, such as an OfficeJet or DeskJet from Hewlett Packard.

A sound controller 620 is also provided in the communication, server, or computing device, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the communication, server, or computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Embodiments described herein provide a customized form of data entry, which results in near-real time communication between field personal and central office personnel. Systems and methods described herein provide the ability to collect and share multi-media information instantly. In addition, time and location intelligence information provides estimated incident distribution and clusters, and it provides estimated driving routes using electronic mapping.

Embodiments described herein provide several advantages over a two-way radio system, such as the ability to send rich data, e.g. text, audio, images, and videos, the ability to transmit the data over secure encrypted channels, the ability to customize data from data entry forms, and the advantage of time and location aware intelligence for agencies. This results in improved information collection by field personnel, improved communication among all personnel, improved decision making, an improved level of intelligence about job performance, and improved utilization of people and data resources.

The foregoing discussion discloses and describes merely exemplary embodiments of the present invention. As will be understood by those skilled in the art, the presently described embodiments may be embodied in other specific forms without departing from the spirit or essential characteristics thereof. Accordingly, the disclosure of the presently described embodiments are intended to be illustrative, but not limiting of the scope, as well as other claims. The disclosure, including any readily discernible variants of the teachings herein, define in part, the scope of the foregoing claim terminology such that no inventive subject matter is dedicated to the public.

The invention claimed is:

1. An information processing system, comprising: circuitry configured to
receive, via a mobile application, a data entry form request;
determine a type of incident as a function of the data entry form request;
select, via a server of the information processing system, at least one data entry form based on the request, wherein the at least one data entry form is customized according to an established protocol for the type of incident and a geographic location of the incident, the established protocol customizing the at least one data entry form to prioritize injury-related inquiries for the type of incident and inquiries relating to a level of danger in a vicinity of the incident;
receive data entered into a selected data entry form;
analyze and process the received entered data based on the established protocol for the type of incident; and
forward and notify via a notification of available results the received entered data to one or more designated entities, wherein a type of notification is based on the type of incident.

2. The information processing system of claim 1, wherein notification is by one or more of an email, a phone call, a text message, or a mobile push notification.

3. The information processing system of claim 1 wherein the circuitry determines the type of data to collect in the customized data entry form, how the data is to be collected, and who can collect the data, based upon the established protocol.

4. The information processing system of claim 3, wherein the circuitry determines how the data will be displayed to the user, how the data will be stored, and where the data will be sent, based upon the established protocol.

5. The information processing system of claim 4, wherein the circuitry determines when to analyze the data, what analysis to perform, and a level of security to enforce, based upon the established protocol.

6. The information processing system of claim 1, wherein the circuitry requests additional data or input from the user based on results of the analyzing and processing.

7. An electronic device, comprising: circuitry configured to
determine a type of incident as a function of a received data entry form request;
present to a user, via a mobile application, a data entry form specific to the determined type of incident, the at least one data entry form being customized according to an established protocol for the type of incident and a geographic location of the incident, the established protocol customizing the at least one data entry form to prioritize injury-related inquiries for the type of incident and inquiries relating to a level of danger in a vicinity of the incident;
analyze, via one or more servers, entered data from the data entry form;
forward, via a notification of available results by a web application, the analyzed entered data to a designated receiver, according to an established protocol of an agency responsible for handling the indicated incident; and
repeat the presenting, analyzing, and forwarding steps in parallel for additional data requested from the user, based upon previously entered data, wherein a type of notification is based on the type of incident.

8. The electronic device of claim 7, wherein the circuitry analyzes new data received from a third party, and forwards the analyzed new data to a corresponding designated receiver according to the established protocol of the agency responsible for handling the indicated incident.

9. The electronic device of claim 8, wherein the agency includes a law enforcement agency, and the new data includes one of audio, video, or photography data from a witness to the indicated incident.

10. The electronic device of claim 9, wherein the designated receiver includes an investigative branch of the law enforcement agency.

11. The electronic device of claim 7, wherein the indicated incident includes a traffic incident.

12. A method comprising:
receiving, via a mobile application, a data entry form request from a user;
determining a type of incident as a function of the received data entry form request;
presenting to the user, via a graphical user interface (GUI), a data entry form specific to the determined type of incident, the at least one data entry form being customized according to an established protocol for the type of incident and a geographic location of the incident, the established protocol customizing the at least one data entry form to prioritize injury-related inquiries for the type of incident and inquiries relating to a level of danger in a vicinity of the incident;
analyzing, via one of a server infrastructure or a cloud computing system, entered data of the data entry form from the user;
forwarding, via a notification of available results by a web application, the analyzed entered data, to one or more designated receivers according to an established protocol of an agency responsible for handling the indicated incident; and
parallel processing, via processing circuitry, the receiving, the presenting, the analyzing, and the forwarding of subsequent data requested and received from the user, wherein a type of notification is based on the type of incidents.

13. The method of claim 12, wherein the GUI is presented based upon a geographical location of the user.

14. The method of claim 12, further comprising:
initiating an action from another entity, based upon the analyzed entered data.

15. The method of claim 12, wherein the
notifying is by one or more of an email, a phone call, a text message, or a mobile push notification.

16. The information processing system according to claim 1, wherein the notification is further generated as a function on one or more preferred designated entities determined by analyzing the received entered data.

17. The information processing system according to claim 16, wherein the preferred designated entities are based on availability and/or location.

18. The information processing system according to claim 17, wherein the circuitry further customizes, via the established protocol, the at least one data entry form to prioritize inquiries related to accessible routes in and out of the vicinity of the incident.

19. The information processing system according to claim 18, wherein the circuitry further customizes, via the established protocol, the at least one data entry form to prioritize inquiries related to an amount of affected people in the vicinity of the incident.

20. The information processing system according to claim 19, wherein the circuitry customizes the at least one data entry form to prioritize inquires in an order of the injury-related inquires, level of danger inquiries, accessible route inquiries and amount of affected people inquiries.

* * * * *